(12) United States Patent
Zhao

(10) Patent No.: US 10,007,146 B2
(45) Date of Patent: Jun. 26, 2018

(54) BACKLIGHT MODULE, MANUFACTURING METHOD THEREOF, DISPLAY DEVICE, AND DRIVING METHOD

(71) Applicant: BOE TECHNOLOGY GROUP CO., LTD., Beijing (CN)

(72) Inventor: Jisheng Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 798 days.

(21) Appl. No.: 14/381,718

(22) PCT Filed: Nov. 13, 2013

(86) PCT No.: PCT/CN2013/087023
§ 371 (c)(1),
(2) Date: Aug. 28, 2014

(87) PCT Pub. No.: WO2014/201797
PCT Pub. Date: Dec. 24, 2014

(65) Prior Publication Data
US 2015/0338704 A1    Nov. 26, 2015

(30) Foreign Application Priority Data

Jun. 20, 2013   (CN) .......................... 2013 1 0247524

(51) Int. Cl.
*G02F 1/1335*   (2006.01)
*F21V 8/00*   (2006.01)
(Continued)

(52) U.S. Cl.
CPC ......... *G02F 1/133605* (2013.01); *G02B 5/02* (2013.01); *G02B 5/04* (2013.01); *G02B 6/0011* (2013.01); *B32B 2457/202* (2013.01)

(58) Field of Classification Search
None
See application file for complete search history.

(56) References Cited

U.S. PATENT DOCUMENTS

| 7,768,690 B2* | 8/2010 | Sampsell | G02B 26/001 216/24 |
| 2002/0114158 A1* | 8/2002 | Chuang | F21V 7/0025 362/243 |

(Continued)

FOREIGN PATENT DOCUMENTS

| CN | 1125327 A | 6/1996 |
| CN | 102650383 A | 8/2012 |
| CN | 103309088 A | 9/2013 |

OTHER PUBLICATIONS

Search Report issued in International Application No. PCT/CN2013/087023, thirteen (13) pages.

*Primary Examiner* — Anthony J Frost
(74) *Attorney, Agent, or Firm* — Nath, Goldberg & Meyer; Joshua B. Goldberg

(57) ABSTRACT

The present invention provides backlight module and manufacturing method thereof, display device comprising backlight module and driving method for driving the display device. The backlight module comprises first substrate and second substrate opposite to each other. Each of the first and second substrates comprises multiple photic areas and shading areas arranged at intervals thereon, and projections of the shading areas of the first substrate on the second substrate completely cover the photic areas of the second substrate. On side of the first substrate opposite to the second substrate, first reflective layers which are bendable are formed on the shading areas thereof, and on side of the second substrate opposite to the first substrate, second reflective layers are formed on the shading areas thereof. The first reflective layers, in a bent state, reflect light to the second reflective layers which then reflect light to the photic areas of the first substrate.

18 Claims, 4 Drawing Sheets

(51) Int. Cl.
*G02B 5/04* (2006.01)
*G02B 5/02* (2006.01)

(56) References Cited

U.S. PATENT DOCUMENTS

2004/0100594 A1 5/2004 Huibers et al.
2008/0278663 A1* 11/2008 Krishnan .............. B29C 39/148
                                                          349/95

* cited by examiner

BACKLIGHT MODULE, MANUFACTURING METHOD THEREOF, DISPLAY DEVICE, AND DRIVING METHOD

This is a National Phase Application filed under 35 U.S.C. 371 as a national stage of PCT/CN2013/087023, filed Nov. 13, 2013, and claims priority benefit from Chinese Application No. 201310247524.6, filed Jun. 20, 2013, the content of each of which is hereby incorporated by reference in its entirety.

FIELD OF THE INVENTION

The present invention relates to the field of display technology, and particularly relates to a backlight module, a manufacturing method thereof, a display device including the backlight module, and a driving method for driving the display device.

BACKGROUND OF THE INVENTION

Basic structure of a Liquid Crystal Display (LCD) comprises a backlight source and a liquid crystal display panel.

As shown in FIG. 1, a conventional liquid crystal display panel comprises an array substrate 103, a color filter substrate 105 and liquid crystals 104 provided between the array substrate 103 and the color filter substrate 105. Further, a lower polarizing film 102b is provided on the outer side of the array substrate 103, an upper polarizing film 102a is provided on the outer side of the color filter substrate 105, and the polarization directions of the upper polarizing film 102a and the lower polarizing film 102b are perpendicular to each other.

Light emitted from the backlight source 101 is converted into linearly polarized light after passing through the lower polarizing film 102b on the outer side of the array substrate 103. If different electric fields are applied to the liquid crystals 104 at different locations to drive the liquid crystals 104 to rotate in different directions, the polarization direction of the linearly polarized light may be deflected to different extents, and thus the linearly polarized light has different transmittances when passing through the polarizing film 102a on the outer side of the color filter substrate 105, which results in emitted light with different brightness and enables a LCD to present a colour display with different grayscales.

The inventor of the present invention realized that at least the following technical problems exist in the prior art. When an existing LCD displays all black, the polarization directions of the lower polarizing film 102b provided on the outer side of the array substrate 103 and the upper polarizing film 102a provided on the outer side of the color filter substrate 105 need to be exactly perpendicular to each other. However, due to the performance of the upper and lower polarizing films 102a and 102b per se, and rotation performance of the liquid crystals 104 and the like, it is actually difficult to achieve the exactly perpendicular relationship between the polarization directions of the upper and lower polarizing films 102a and 102b. Therefore, light emitted from the backlight source 101 cannot be completely blocked, that is, true black cannot be displayed.

SUMMARY OF THE INVENTION

The technical problems to be solved by the present invention include providing a backlight module that can achieve all-black display and improved contrast, a manufacturing method thereof, a display device comprising the backlight module and a driving method of the display device, in view of the problem that the existing display devices are unable to display all black.

According to an aspect of the present invention, a backlight module is provided, which comprises a first substrate and a second substrate opposite to each other. Each of the first substrate and the second substrate comprises a plurality of photic areas and a plurality of shading areas, the photic areas and the shading areas are arranged on the first substrate and the second substrate at intervals, projections of the shading areas of the first substrate on the second substrate completely cover the photic areas of the second substrate. On a side of the first substrate opposite to the second substrate, a first reflective layer which is bendable is formed on each of the shading areas of the first substrate, and on a side of the second substrate opposite to the first substrate, a second reflective layer is formed on each of the shading areas of the second substrate. The first reflective layers, in a bent state, reflect light reaching the first reflective layers after passing through the photic areas of the second substrate to the second reflective layers, and the second reflective layers reflect the light reflected thereto to the photic areas of the first substrate. The backlight module further comprises a plurality of electrodes which are provided on the side of the first substrate opposite to the second substrate and are connected to the first reflective layers, respectively.

In a condition that no voltage is applied to the backlight module, the first reflective layers which are bendable do not bend, and accordingly, light emitted from the backlight source, passing through the photic areas of the second substrate and then reaching the first reflective layers which are not bent will be totally reflected back. Therefore the light emitted from the backlight source cannot pass through the backlight module, and at this point, the liquid crystal panel displays as all black.

Preferably, projections of the shading areas of the second substrate on the first substrate and the shading areas of the first substrate may be complementary to each other in shape.

Preferably, each of the first reflective layers may comprise at least one bendable reflective sheet.

Preferably, each of the plurality of electrodes may be connected to one of the bendable reflective sheets corresponding thereto, respectively.

Preferably, the bendable reflective sheet may comprise a light-reflecting film and an electro-bend film attached thereto, the electro-bend film is connected to the electrode.

Preferably, the electro-bend film may be made of a material containing polyacrylic rubber or vinylidene fluoride compound.

Preferably, the electro-bend film may bend against the first substrate when driven by the electrode.

Preferably, the light-reflecting film may be made of a material containing any one of reflective fabric, aluminium and copper.

Preferably, the second reflective layer may be made of a material containing any one of reflective fabric, aluminium and copper.

Preferably, the backlight module may further comprise a shielding layer, which covers the shading areas of the first substrate.

According to another aspect of the present invention, a manufacturing method of a backlight module is provided, the manufacturing method comprises steps of: preparing a first substrate comprising a plurality of photic areas and a plurality of shading areas arranged at intervals on the first substrate; forming first reflective layers which are bendable on the shading areas of the first substrate; preparing a second substrate comprising a plurality of photic areas and a plurality of shading areas arranged at intervals on the second substrate; forming second reflective layers on the shading areas of the second substrate; and forming the backlight module with the first substrate and the second substrate, wherein, a side of the first substrate on which the first reflective layers are formed is opposite to a side of the second substrate on which the second reflective layers are formed, and projections of the shading areas of the first substrate on the second substrate completely cover the photic areas of the second substrate.

Preferably, the step of forming the first reflective layers may comprise steps of: sequentially forming an electrode layer, an electro-bend film layer and a light-reflecting film layer on the first substrate, the electrode layer being made of a material with etching selectivity with respect to the electro-bend film layer and the light-reflecting film layer; sequentially removing the light-reflecting film layer and the electro-bend film layer on the photic areas of the first substrate through an etching process, and keeping the light-reflecting film layer and the electro-bend film layer remaining on the shading areas of the first substrate, the remaining light-reflecting film layer and electro-bend film forming bendable reflective sheets which form the first reflective layers on the shading areas of the first substrate; and patterning the electrode layer through an etching process so as to form electrodes, such that each of the electrodes is at one end of the bendable reflective sheet.

Preferably, the etching process performed on the electrode layer may be an anisotropic etching process.

Preferably, the manufacturing method may further comprise a step of: forming a shielding layer covering the shading areas of the first substrate on the first substrate.

According to another aspect of the present invention, a display device is provided, and the display device comprises the above backlight module.

Since the display device comprises the above backlight module, the display device may display all black.

Preferably, the display device may comprise a liquid crystal panel, wherein the first substrate of the backlight module and an array substrate of the liquid crystal panel may be the same one.

Preferably, the second substrate of the backlight module may be integrated with an optical film material of a backlight source of the display device.

Preferably, the optical film material may comprise any one of a light guide plate, a diffusion plate and a prism film.

According to still another aspect of the present invention, a driving method of a display device is provided, the display device comprises the above backlight module, and the method comprises: keeping the first reflective layers unbent when displaying all black contents; and causing the first reflective layers to bend when displaying non-all-black contents.

According to the driving method of the display device provided by the present invention, when no voltage is applied, the first reflective layers which are bendable do not bend, accordingly, light irradiating on the first reflective layer which are not bent are totally reflected back, and therefore no light passes through the backlight module. The display device applied the driving method may achieve all-black display.

Figure 1:
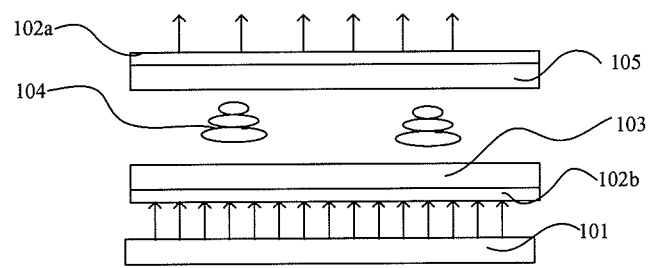
FIG. 1 is a schematic diagram of a structure of a liquid crystal display device of the prior art.

REFERENCE NUMERALS IN THE
RESPECTIVE ACCOMPANYING DRAWINGS 101, backlight source;
102a, upper polarizing film;
102b, lower polarizing film;
103, array substrate;
104, liquid crystal;
105, color filter substrate;
201, reflective sheet;
202, second reflective layer;
203, electrode;
204, first substrate;
205, second substrate;
206, liquid crystal panel;
207, shielding layer;
Q1, photic area;
Q2, shading area;
601, electrode layer;
602, electro-bend film layer;
603, light-reflecting film layer;
602', electro-bend film;
603', light-reflecting film.

DETAILED DESCRIPTION OF THE
EMBODIMENTS

To enable those skilled in the art to better understand technical solutions of the present invention, the present invention will be further described below in detail in conjunction with the accompanying drawings and the specific implementations.

Spatially relative terms such as "on", "above", "below", "upper", "lower" and the like used in the present invention refer to those directions in FIGS. 2 to 4.

Figure 2:
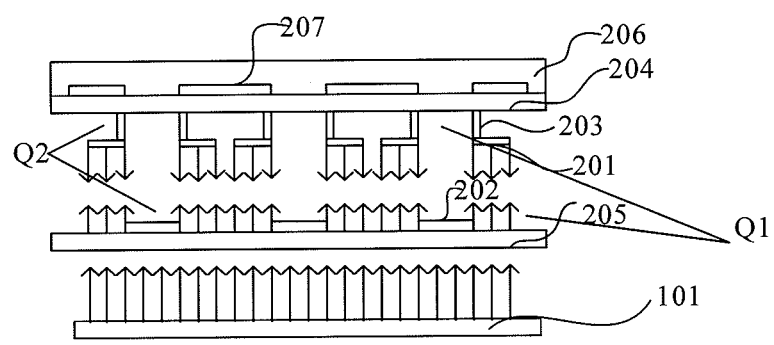
FIG. 2 is a schematic diagram of a structure of a backlight module with no voltage applied thereto according to an embodiment of the present invention.
Figure 3:
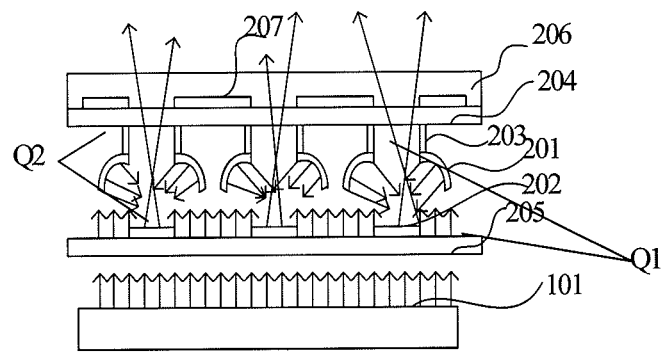
FIG. 3 is a schematic diagram of a structure of a backlight module with a voltage applied thereto according to an embodiment of the present invention.
Figure 4:
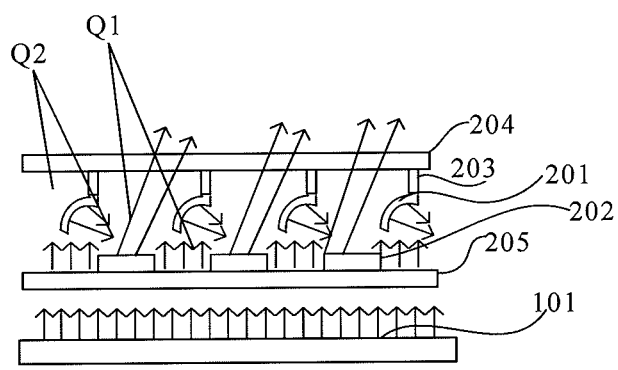
FIG. 4 is a schematic diagram of a structure of a backlight module according to another embodiment of the present invention.
Figure 5:
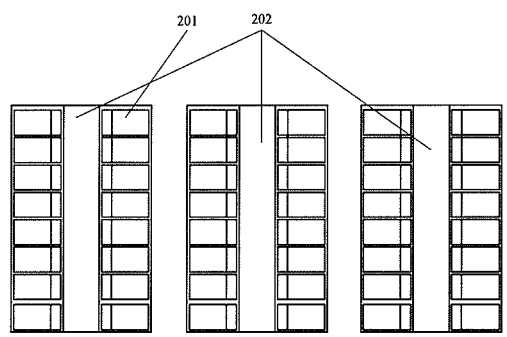
FIG. 5 is a top view of a backlight module according to an embodiment of the present invention.

FIG. 2 is a schematic diagram of a structure of a backlight module with no voltage applied thereto according to an embodiment of the present invention, FIG. 3 is a schematic diagram of a structure of a backlight module with a voltage applied thereto according to an embodiment of the present invention, FIG. 4 is a schematic diagram of a structure of a backlight module according to another embodiment of the present invention, and FIG. 5 is a top view of a backlight module according to an embodiment of the present invention.

Referring to FIGS. 2 to 5, a backlight module according to an embodiment of the present invention comprises a first substrate 204 and a second substrate 205 opposite to each other. Each of the first substrate 204 and the second substrate 205 comprises a plurality of photic areas Q1 and a plurality of shading areas Q2, the photic areas Q1 and the shading areas Q2 are arranged on the first substrate 204 and the second substrate 205 at intervals. That is, on each of the first substrate 204 and the second substrate 205, the shading areas Q2 and the photic areas Q1 adjoin each other and are alternately arranged. Projections of the shading areas Q2 of the first substrate 204 on the second substrate 205 completely cover the photic areas Q1 of the second substrate 205.

It should be understood that, the backlight module provided by the embodiment of the present invention may be used in conjunction with a backlight source 101 provided therebelow and a liquid crystal panel 206 provided thereabove.

On a side of the first substrate 204 opposite to the second substrate 205, a first reflective layer which is bendable is formed on each of the shading areas Q2 of the first substrate 204, and the first reflective layer may comprise at least one bendable reflective sheet 201 (thereinafter referred to as "reflective sheet 201"). On a side of the second substrate 205 opposite to the first substrate 204, a second reflective layer 202 is formed on each of the shading areas Q2 of the second substrate 205. The reflective sheets 201, in a bent state, may reflect light reaching the reflective sheets 210 after passing through the photic areas Q1 of the second substrate 205 to the second reflective layers 202, and the second reflective layers 202 reflect the light reflected thereto to the photic areas Q1 of the first substrate 204. Subsequently, the light is emitted out of the backlight module and into the liquid crystal panel 206 after passing through the photic areas Q1 of the first substrate 204, thus enabling the liquid crystal panel 206 to display a picture.

Referring to FIG. 2, in a condition that no voltage is applied to the backlight module according to the embodiment of the present invention, the reflective sheets 201 do not bend, and the light emitted from the backlight source 101 will be totally reflected back to the backlight source 101 after reaching the unbent reflective sheets 201. At this point the light emitted from the backlight source 101 cannot pass through the first substrate 204. That is, the liquid crystal panel 206 provided above the backlight module provided by the present invention displays an all-black screen.

Here, projections of the shading areas Q2 of the second substrate 205 on the first substrate 204 and the shading areas Q2 of the first substrate 204 may be complementary to each other in shape. That is, the first reflective layer formed on the shading areas Q2 of the first substrate 204 and the second reflective layer formed on the shading areas Q2 of the second substrate 205 are complementary to each other in shape. In this way, manufacturing cost may be saved and total area of the photic areas Q1 of the first substrate 204 may be maximized.

The backlight module may further comprise a plurality of electrodes 203, the electrodes 203 may be provided on the side of the first substrate 204 opposite to the second substrate 205, are connected to the reflective sheets 201, respectively, and used for driving the reflective sheets 201 to bend.

Figure 6:
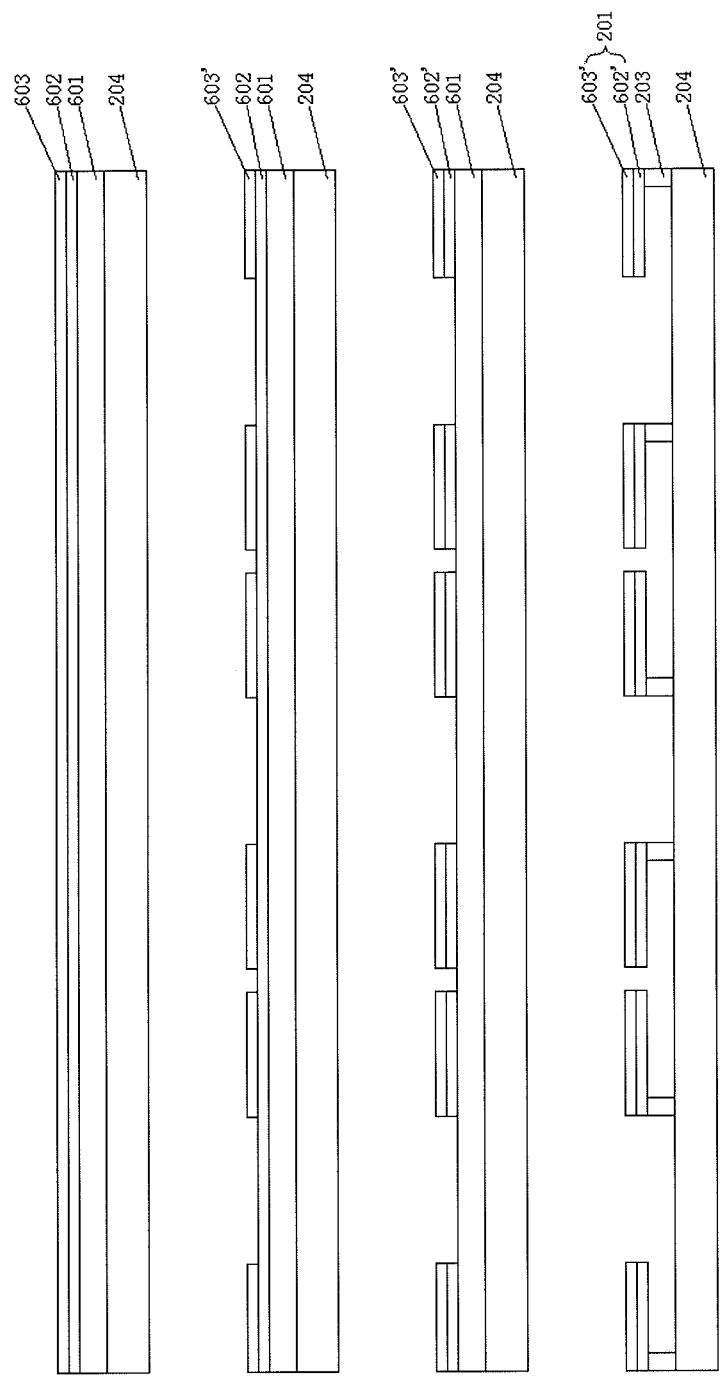
FIG. 6 schematically illustrates process steps of a method of forming first reflective layers which are bendable on shading areas of a first substrate of a backlight module according to an embodiment of the present invention.

Referring to FIG. 6, the reflective sheet 201 may comprise a light-reflecting film 603' and an electro-bend film 602' attached thereto, and the electro-bend film 602' is connected to the electrode 203. The electro-bend film 602' may bend against the first substrate 204 (i.e., towards the second substrate 205) when driven by the electrode 203. That is, in a condition that a voltage is applied, the reflective sheet 201 may bend, as shown in FIGS. 3 and 4. Each of the bent reflective sheets 201 may form a concave surface which reflects light reaching the concave surface onto the second reflective layer 202 of the second substrate 205. In manufacturing the reflective sheet 201, a radius of curvature may be properly set to locate a focal point of the concave surface formed by the bent reflective sheet 201 on the second reflective layer 202, so that the reflective sheet 201 in a bent state may reflect all of the light reaching the reflective sheet 201 onto the second reflective layer 202. Of course, the focal point of the concave surface formed by the bent reflective sheet 201 may be located in a nearby area above or below the second reflective layer 202 shown in FIGS. 3 and 4, as long as the reflective sheet 201 in a bent state may reflect the light into the corresponding area of the second reflective layer 202.

In this case, when light emitted from the backlight source 101 irradiates on the reflective sheets 201, the bent reflective sheets 201 reflect the light to the second reflective layers 202, and the second reflective layers 202 reflect the light reflected by the reflective sheets 201 again, and the light then passes through the photic areas Q1 of the first substrate 204. The light passing through the photic areas Q1 of the first substrate 204 enters the liquid crystal panel 206 to enable the liquid crystal panel 206 to display a picture.

A material that the electro-bend film 602' is made of may contain polyacrylic rubber or vinylidene fluoride compound. However, the present invention is not limited thereto. Other electro-bend films which enable the reflective sheets 201 to bend may also be adopted. A material that the light-reflecting film 603' is made of may contain any one of reflective fabric, aluminium and copper. However, the present invention is not limited thereto. Other reflective materials may also be adopted. In addition, a material that the second reflective layer 202 is made of may contain any one of reflective fabric, aluminium and copper. However, the present invention is not limited thereto. Other reflective materials may also be adopted.

In the structure shown in FIGS. 2 and 3, the first reflective layer formed on each of the shading areas Q2 of the first substrate 204 comprises two reflective sheets 201. In these figures, a basic structure of the reflective sheet 201 is only illustrated by way of example, and length or shape of the reflective sheet 201 is not specifically limited. In actual manufacturing, two reflective sheets 201 of each first reflective layer may have the same length, and the total length of the two reflective sheets 201 may be equal to the length of one shading area Q2 of the first substrate 204. In this way, light emitted from the backlight source 101 may be prevented from passing through the backlight module and entering the liquid crystal panel 206 in a condition that the reflective sheets 201 are not bent.

However, the backlight module provided by the present invention may also have the structure shown in FIG. 4. In FIG. 4, the first reflective layer formed on each of the shading areas Q2 of the first substrate 204 may comprise only one reflective sheet 201.

In addition, a shielding layer 207 may further be formed on the first substrate 204. The shielding layer 207 covers the shading areas Q2 of the first substrate 204, so that light leak due to gaps between adjacent reflective sheets 201 can be avoided when the reflective sheets 201 are bent, and meanwhile light emitted from the backlight source 101 may be prevented from passing through the gaps between the adjacent reflective sheets 201 and entering the liquid crystal panel 206 when the reflective sheets 201 are not bent. As shown in FIGS. 2 and 3, the shielding layer 207 may be provided at a side of the first substrate 204 away from the second substrate 205 (i.e., light-exiting surface of the first substrate 204). At this point, the shielding layer 207 may be embedded in the array substrate of the liquid crystal panel 206, or may be sandwiched between the liquid crystal panel 206 and the first substrate 204. In addition, the shielding layer 207 may also be provided at the side of the first substrate 204 opposite to the second substrate 205 (i.e., light incident surface of the first substrate 204), as long as it can cover the gaps between adjacent reflective sheets 201 on the shading areas Q2 of the first substrate 204.

Though the working principle of the backlight module provided by the present invention has been described in conjunction with the backlight source 101 and the liquid crystal panel 206, those skilled in the art should understand that a display device comprising the backlight module provided by the present invention may use natural light, instead of the backlight source, to serve as the light source for the backlight module.

The present invention further provides a method for manufacturing the above backlight module, which specifically comprises the following steps of:

preparing a first substrate 204, which comprises a plurality of photic areas Q1 and a plurality of shading areas Q2 arranged at intervals on the first substrate 204;

forming first reflective layers which are bendable on the shading areas Q2 of the first substrate 204;

preparing a second substrate 205, which comprises a plurality of photic areas Q1 and a plurality of shading areas Q2 arranged at intervals on the second substrate 205;

forming second reflective layers 202 on the shading areas Q2 of the second substrate 205; and forming the backlight module with the first substrate 204 and the second substrate 205, wherein, a side of the first substrate 204 on which the first reflective layers are formed is opposite to a side of the second substrate 205 on which the second reflective layers 202 are formed, and projections of the shading areas Q2 of the first substrate 204 on the second substrate 205 completely cover the photic areas Q1 of the second substrate 205.

FIG. 6 schematically illustrates process steps of a method of forming first reflective layers which are bendable on shading areas of a first substrate of a backlight module according to an embodiment of the present invention.

Referring to FIG. 6, the step of forming the first reflective layers which are bendable may comprise steps of:

sequentially forming an electrode layer 601, an electro-bend film layer 602 and a light-reflecting film layer 603 on the first substrate 204, the electrode layer 601 being made of a material with etching selectivity with respect to the electro-bend film layer 602 and the light-reflecting film layer 603;

sequentially removing the light-reflecting film layer 603 and the electro-bend film layer 602 on the photic areas Q1 of the first substrate 204 through an etching process, and keeping the light-reflecting film layer (light-reflecting film 603') and the electro-bend film layer (electro-bend film 602') remaining on the shading areas Q2 of the first substrate 204, the remaining light-reflecting film layer and electro-bend film layer forming bendable reflective sheets 201 which form the first reflective layers on the shading areas Q2 of the first substrate 204; and patterning the electrode layer 601 through an etching process so as to form electrodes 203, such that each of the electrodes 203 is at one end of the bendable reflective sheet 201.

In the etching process performed on the electrode layer 601, since the etching process performed on the electrode layer 601 with an etchant is anisotropic, the etchant may be used to etch along portions between the bendable reflective sheets 201 and the first substrate 204 by way of controlling etching time and amount of the etchant, so as to ensure that the each of the electrodes 203 is at one end of the reflective sheet 201.

The method may further comprise a step of forming, on the first substrate 204, a shielding layer 207 covering the shading areas Q2 of the first substrate 204. The shielding layer 207 may be formed on a light-exiting surface of the first substrate 204, or may be formed on a light incident surface of the first substrate 204. When the shielding layer 207 is formed on the light incident surface of the first substrate 204, the shielding layer 207 is formed on the first substrate 204 before the first reflective layers which are bendable are formed on the shading areas Q2 of the first substrate 204.

The present invention further provides a display device comprising the above backlight module. The display device may comprise a liquid crystal panel 206. The first substrate 204 of the backlight module and an array substrate of the liquid crystal panel 206 may be the same substrate, that is, the electrodes 203 of the backlight module may be formed on the array substrate of the liquid crystal panel 206.

In addition, the second substrate 205 of the backlight module may be integrated with an optical film material of a backlight source 101 of the display device. The optical film material may comprise any one of a light guide plate, a diffusion plate and a prism film.

The display device may be any product or component with a display function, as such a mobile phone, a tablet computer, a television, a display, a notebook computer, a digital photo frame, a navigator or the like.

Since the display device comprises the above backlight module, the liquid crystal panel 206 of the display device displays all black when no voltage is applied to the backlight module.

In the present invention, the display device may further comprise a backlight source 101 arranged below the backlight module to serve as the light source for the backlight module. Of course, in the display device provided by the present invention, the backlight source may not be included, and instead, natural light may be used as the light source for the backlight module.

The display device of the embodiment may also comprise other conventional structures, such as a power supply unit, a display driving unit and the like.

The present invention provides a driving method for driving the above display device, the display device comprises the backlight module provided by the present invention, and the method comprises steps of: keeping the first reflective layers formed on the shading areas Q2 of the first substrate 204 of the backlight module unbent when displaying all-black contents; and causing the first reflective layers to bend when displaying non-all-black contents.

Referring to the embodiment of the backlight module provided by the present invention, when displaying all-black contents, no voltage is applied to the backlight module, the bendable reflective sheets 201 do not bend, light emitted from the backlight source 101 will not be reflected to the second reflective layers 202 after reaching the reflective sheets 201, therefore, no light enters the liquid crystal panel 206 and the display device displays all black.

When displaying non-all-black contents, a voltage is applied to the backlight module, the bendable reflective sheets 201 bend, light emitted from the backlight source 101 is reflected to the second reflective layers 202 after reaching the reflective sheets 201, therefore, light enters the liquid crystal panel 206 and the display device displays a picture.

In the present invention, the liquid crystal panel 206 may be replaced with other display panel such as an electrochromic display panel or the like.

It can be understood that, the above implementations are merely exemplary implementations for explaining the principle of the present invention, but the present invention is not limited thereto. For those skilled in the art, various variations and improvements may be made without departing from the spirit and essence of the present invention, and these variations and improvements are also deemed as the protection scope of the present invention.

The invention claimed is:

1. A backlight module, comprising a first substrate and a second substrate opposite to each other,
    each of the first substrate and the second substrate comprising a plurality of photic areas and a plurality of shading areas, the photic areas and the shading areas being arranged on the first substrate and the second substrate at intervals, and projections of the shading areas of the first substrate on the second substrate completely covering the photic areas of the second substrate, wherein the photic areas are transparent,
    on a side of the first substrate facing the second substrate, a plurality of first reflective layers which are bendable being formed on each of the shading areas of the first substrate, and
    on a side of the second substrate facing the first substrate, a plurality of second reflective layers being formed on each of the shading areas of the second substrate,
    wherein, the first reflective layers, in a bent state, reflect light reaching the first reflective layers after passing through the photic areas of the second substrate to the second reflective layers, and the second reflective layers reflect the light reflected thereto to the photic areas of the first substrate, and
    wherein, the backlight module further comprises a plurality of electrodes which are provided on the side of the first substrate facing the second substrate and are connected to the first reflective layers, respectively.

2. The backlight module of claim 1, wherein, projections of the shading areas of the second substrate on the first substrate and the shading areas of the first substrate are complementary to each other in shape.

3. The backlight module of claim 1, wherein, each of the first reflective layers comprises at least one bendable reflective sheet.

4. The backlight module of claim 3, wherein, each of the plurality of electrodes is connected to one of the bendable reflective sheets corresponding thereto, respectively.

5. The backlight module of claim 4, wherein, the bendable reflective sheet comprises a light-reflecting film and an electro-bend film attached thereto, and the electro-bend film is connected to the electrode,
    wherein the electro-bend film is a film that bends when driven by the electrode.

6. The backlight module of claim 5, wherein, the electro-bend film is made of a material containing polyacrylic rubber or vinylidene fluoride compound.

7. The backlight module of claim 5, wherein, the electro-bend film bends in a direction away from the first substrate when driven by the electrode.

8. The backlight module of claim 5, wherein, the light-reflecting film is made of a material containing any one of reflective fabric, aluminium and copper.

9. The backlight module of claim 1, wherein, the second reflective layer is made of a material containing any one of reflective fabric, aluminium and copper.

10. The backlight module of claim 1, further comprising a shielding layer, which covers the shading areas of the first substrate.

11. A manufacturing method of a backlight module, comprising steps of:
    preparing a first substrate comprising a plurality of photic areas and a plurality of shading areas arranged at intervals on the first substrate wherein the photic areas are transparent;
    forming first reflective layers which are bendable on the shading areas of the first substrate;
    preparing a second substrate comprising a plurality of photic areas and a plurality of shading areas arranged at intervals on the second substrate;
    forming second reflective layers on the shading areas of the second substrate; and
    forming the backlight module with the first substrate and the second substrate,
    wherein, a side of the first substrate on which the first reflective layers are formed faces a side of the second substrate on which the second reflective layers are formed, and projections of the shading areas of the first substrate on the second substrate completely cover the photic areas of the second substrate;
    wherein the step of forming the first reflective layers comprises steps of:
    sequentially forming an electrode layer, an electro-bend film layer and a light-reflecting film layer on the first substrate, the electrode layer being made of a material with etching selectivity with respect to the electro-bend film layer and the light-reflecting film layer;
    sequentially removing the light-reflecting film layer and the electro-bend film layer on the photic areas of the first substrate through an etching process, and keeping the light-reflecting film layer and the electro-bend film layer remaining on the shading areas of the first substrate, the remaining light-reflecting film layer and electro-bend film forming bendable reflective sheets which form the first reflective layers on the shading areas of the first substrate; and
    patterning the electrode layer through an etching process so as to form electrodes, such that each of the electrodes is at one end of the reflective sheet,
    wherein the electro-bend film is a film that bends when driven by the electrode.

12. The manufacturing method of a backlight module of claim 11, wherein the etching process performed on the electrode layer is an anisotropic etching process.

13. A display device, comprising the backlight module of claim 1.

14. The display device of claim 13, further comprising a liquid crystal panel, wherein the first substrate of the backlight module and an array substrate of the liquid crystal panel are the same substrate.

15. The display device of claim 13, wherein, the second substrate of the backlight module is integrated with an optical film material of a backlight source of the display device.

16. The display device of claim 14, wherein, the second substrate of the backlight module is integrated with an optical film material of a backlight source of the display device.

17. The display device of claim 15, wherein, the optical film material comprises any one of a light guide plate, a diffusion plate and a prism film.

18. The display device of claim 16, wherein, the optical film material comprises any one of a light guide plate, a diffusion plate and a prism film.

* * * * *